Sept. 21, 1965  J. L. MOSSEY  3,207,268
SPOT TYPE DISK BRAKE
Filed Sept. 10, 1962  2 Sheets-Sheet 1
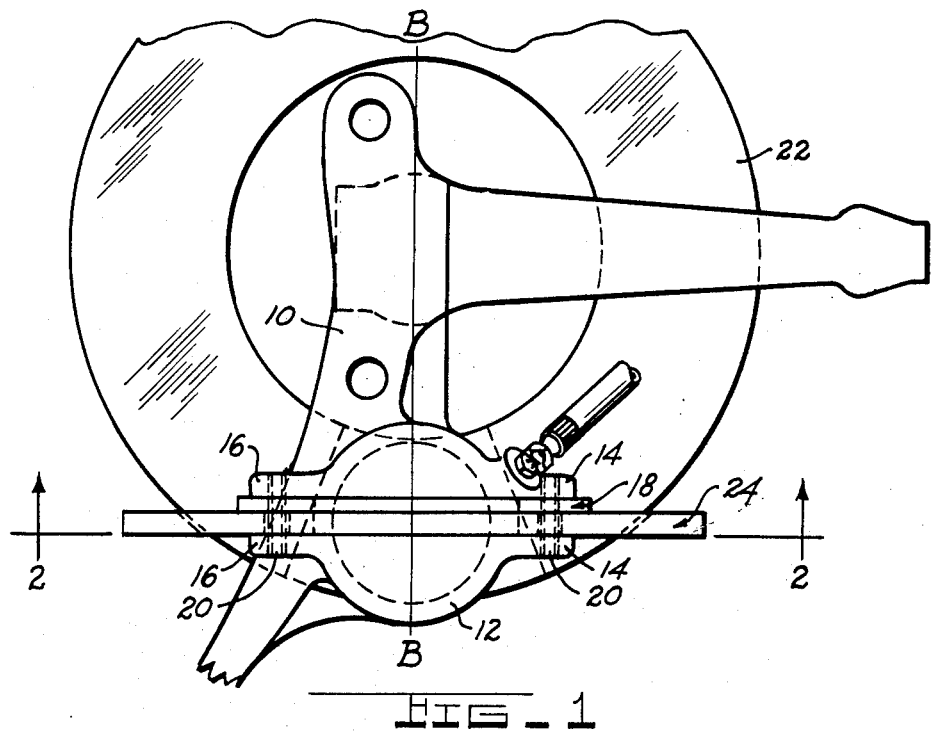
FIG_1
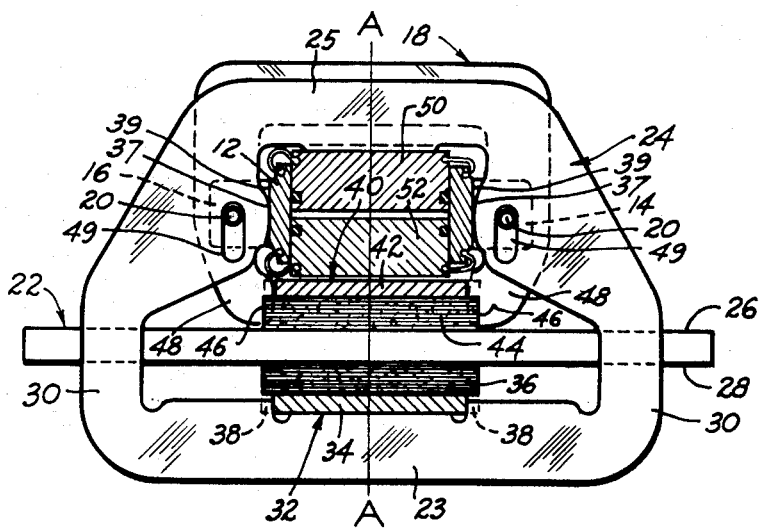
FIG_2
INVENTOR.
JOSEPH L. MOSSEY.
BY
Sheldon F. Raizes
ATTORNEY.

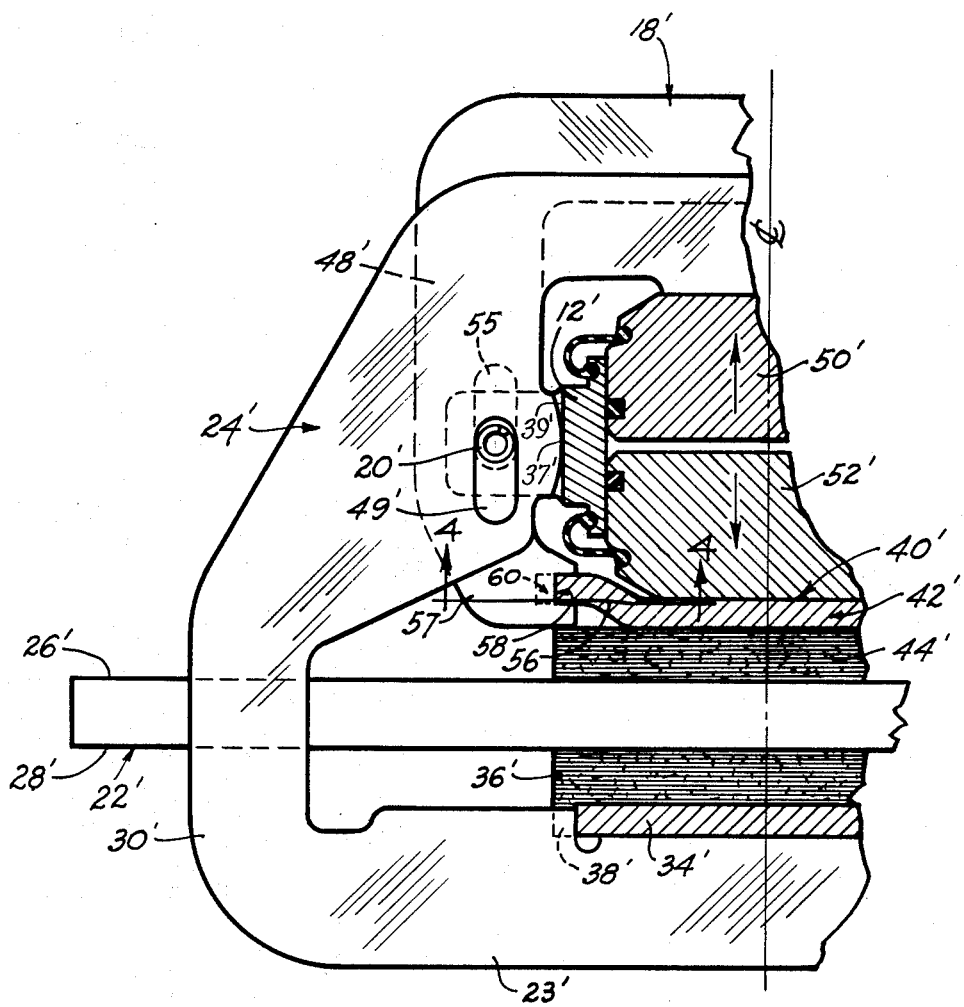
FIG_3
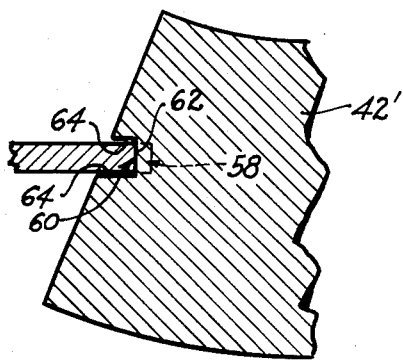
FIG_4
INVENTOR.
JOSEPH L. MOSSEY.
BY
*Sheldon D. Roizes*
ATTORNEY.

United States Patent Office 3,207,268
Patented Sept. 21, 1965

3,207,268
SPOT TYPE DISK BRAKE
Joseph L. Mossey, South Bend, Ind., assignor to The Bendix Corporation, South Bend, Ind., a corporation of Delaware
Filed Sept. 10, 1962, Ser. No. 222,394
4 Claims. (Cl. 188—73)

This invention relates to a disk brake.

An object of this invention is to provide a disk brake wherein torque exerted on each shoe is transferred independently of each other to a stationary support member located on one side of a rotor.

Another object of the invention is to provide a disk brake wherein a stationary support located on one side of a rotor receives the torque exerted on the brake shoes of the disk brake and also carries actuating means for said brake shoes.

A further object of the invention is to provide a disk brake which is capable of self-alignment with a brake rotor.

A still further object of the invention is to provide a disk brake of such construction that the components thereof may be assembled on a vehicle.

An over-all object of the invention is to provide for an inexpensive and efficient brake for achieveing the above results.

Other objects and features of the invention will become apparent from a consideration of the following description which proceeds with reference to the accompanying drawings wherein:

FIGURE 1 is a front elevational view of the brake assembly of the present invention;

FIGURE 2 is a section view taken along line 2—2 of FIGURE 1;

FIGURE 3 is an exploded partial section view similar to that of FIGURE 2 but illustrating a modified embodiment thereof; and FIGURE 4 is a section view taken along line 4—4 of FIGURE 3.

Referring to FIGURE 1, there is illustrated a steering arm forging 10 which has integral therewith a wheel cylinder housing 12 having a pair of spaced ears 14 and 16 extending from diametrically opposite sides. A C-shaped stamping serving as a force transmitting member 18 is connected to the ears 14 and 16 by pins 20 and fixed against substantial axial movement toward and away from a rotor 22 even though there is a slight clearance between the pins 20 and the openings of member 18 through which the pins extend. A second stamping serving as a force transmitting member 24 is slidably received in the space defined by each set of ears 14 and 16 and has portions 23, 25 extending chordally of the rotor opposite each face 26 and 28 and also has portions 30 extending transversely of the outer periphery of the rotor. The force transmitting member 24 has elongated slots 49 having a width which is slightly greater than the outer diameter of the pins 20. Due to the slots 49, the force transmitting member 24 is free to slide axially relative to the pins 20 and housing 12. Each force transmitting member has curved bearing surfaces 37 engaging generally flat surfaces 39 through which torque is transferred to the wheel cylinder housing 12.

A brake shoe 32 is provided and comprises a backing plate 34 and friction lining 36 attached thereto. The backing plate 34 has two notches 38 which receives a portion of the force transmitting member 24 providing a rigid connection between the brake shoe 32 and the force transmitting portion 23. Thus, it will be seen, that, movement of the portion 23 toward the rotor 22 will bring the friction lining 36 into engagement with the friction face 28 of the rotor. A second brake shoe 40 comprising a backing plate 42 and friction lining 44 attached thereto is provided opposite the friction face 26 of the rotor and is located between the friction face 26 and the wheel cylinder housing 12. The backing plate 42 and friction lining 44 have slots 46 therein being slidably received on the legs 48 of the force transmitting member 18. A pair of oppositely acting pistons 50 and 52 are slidably and sealingly mounted within the wheel cylinder housing with the piston 50 being in engagement with the portion 25 of the force transmitting member 24 and the piston 52 being in engagement with the backing plate 42 of the brake shoe 40.

Upon actuation of the brake, fluid pressure will move the pistons 50, 52 away from each other thereby moving the portion 23 of the force transmitting member 24 toward the rotor 22 resulting in bringing brake lining 36 into engagement with the rotor friction surface 28 and the piston 52 will move the brake shoe 40 relative to the force transmitting member 18 and into engagement with its respective rotor friction face 26. The torque exerted by the rotor 12 on the brake shoe 32 will be transmitted through the force transmitting member 24 directly to the housing 12 and the torque exerted on the brake shoe 40 by the rotor will be transmitted through the force transmitting member 18 directly to the housing 12. The force transmitting members may rock about an axis B—B due to the curved bearing surfaces 37 of the force transmitting members 18 and 24 engaging the flat surfaces 39 of the wheel cylinder housing and since there is slight clearance between the pins 20 and the openings of the force transmitting member 18 through which they extend, and the slight clearance between the pins 20 and the side edges of slots 49 of force transmitting member 24. The space defined by the ears 16 and the space defined by the ears 14 each provides a clearance between the force transmitting members and the ears which allows the force transmitting members to also rock about an axis A—A. Thus the brake shoes and the force transmitting member can align themselves with a rotor 22.

There is shown a modified embodiment of the brake and the same structure, as in the previous embodiment, is designated with like reference numerals with prime marks affixed thereto. The differing feature between this embodiment and the previous embodiment is that the force transmitting means 18′ is slidable relative to the wheel cylinder housing 12′ and a brake shoe 40′ is fixed to the force transmitting member 18′ for movement therewith. The force transmitting member is provided with an elongated slot 55 whose side edges are slightly wider than the outside diameter of pin 20′. This slot permits axial movement of the force transmitting member relative to the housing 12. The backing plate 42′ is bent away from the friction lining 44′ at its lateral ends 56. Each leg 48′ of force transmitting member 18′ has a portion 57 with the slot 58 receiving the end 56 of the backing plate, which end 56 has a slot 60 receiving the end portion 57 of legs 48. The shoe is prevented from axial movement by the spaced parallel edges of the slot 58, from lateral movement away from the axis of the brake by the end 62 of the slot 58 and from vertical movement by the edges 64 of the slot 60. The operation of this embodiment is the same as the previous embodiment except that upon actuation of piston 42′ the piston will move brake shoe 40′ and the force transmitting member 18′ toward the rotor 22.

Instead of constructing a curved bearing surface 37′ on the force transmitting members, housing bearing surfaces 39′ may be curved and the bearing surfaces 37′ may be straight or both surfaces may be curved in the reverse direction to allow for rocking movement.

Thus it can be seen that the heretofore mentioned objects have been accomplished with a brake which requires relatively few and inexpensive parts and can be easily assembled.

Although the embodiments of the invention have been chosen for purposes of illustration it will be understood that this is in no way restrictive of the invention. It is to be reasonably expected that those skilled in the art can make numerous adaptations and revisions of the invention without departing from its underlying principles, and therefore it is intended that such revisions and variations as incorporate the herein disclosed principles will be included within the scope of the following claims as equivalents thereof.

I claim:

1. A disk brake comprising a rotatable disk having friction surfaces on each side thereof, a stationary support member located at one side of said disk, a fluid motor housing located solely on said one side of said disk and rigidly secured to said support member, a bore in said housing the axis of which is generally parallel to the axis of which said disk rotates, oppositely acting pistons slidingly and sealingly mounted in said bore, one of said pistons being slidable toward and the other piston being slidable away from said friction surface on said one side of said rotor, a first pair of spaced ears extending from one side of said housing in a generally chordal direction, a second pair of spaced ears extending from the opposite side of said housing in an opposite chordal direction from said first pair of ears, each pair of ears defining a slot therebetween, a C-shaped first force transmitting member having the legs thereof straddling said fluid motor housing, each of said legs being disposed in a respective one of said slots, said C-shaped member being located solely on one side of said rotor, a first friction member located between said one piston and said rotor friction surface on said one side of said rotor, means connecting said first friction member to the legs of said C-shaped member for movement of said first friction member toward and away from its respective rotor friction surface, a second force transmitting member having an opening therein, the edges of said opening extending on each side of said rotor and transverse to the outer periphery of said rotor, a second friction member on the other side of said rotor, said edges encompassing said fluid motor housing and said second friction member, means connecting said second friction member to said second force transmitting member for movement of said friction member toward and away from its respective rotor friction surface, said transverse edges of said second force transmitting member being received in a respective one of said slots, a pin secured to each pair of ears and extending therebetween, an elongated opening in said second force transmitting member adjacent each transverse edge receiving a respective pin therethrough whereby said second force transmitting member is slidably secured to said fluid motor housing, an opening in each of said legs receiving a respective one of said pins therethrough thereby securing said first transmitting member to said fluid motor housing, an anchoring surface on each of said transverse edges, an anchoring surface on each of said legs, an anchoring surface on each of said sides of said fluid motor housing located between each pair of spaced ears for coacting with a respective said anchoring surface on each of said force transmitting members, each of said anchoring surfaces on said legs and the respective anchoring surface on said second transmitting members defining one component and their respective anchoring surface on said motor housing defining the other component of a respective set of coacting anchoring surfaces, one component of said coacting anchoring surfaces of each set being round and the other component of said coacting anchoring surfaces of each set being generally flat whereby said force transmitting members can rock about an axis generally perpendicular to said axis of disk rotation, said one piston being operatively connected to said first friction member and said other piston being operatively connected to said second force transmitting member for moving said first friction member and said second force transmitting member in opposite directions to engage said friction members with their respective rotor friction surfaces, said first and second friction members transmitting torque through their respective force transmitting members directly to said fluid motor housing.

2. A brake as recited in claim 1 wherein said opening in each of said legs is elongated for slidably securing said first force transmitting member to said fluid motor housing and said first friction member is connected to said first force transmitting member for movement therewith.

3. A brake as recited in claim 1 wherein said first force transmitting member is secured to said fluid motor housing against substantial movement toward or away from said rotor friction surfaces and said first friction member is slidably secured to said first force transmitting member for relative movement therebetween toward and away from said rotor friction surfaces.

4. The structure as recited in claim 1 wherein the space between each pair of ears is greater than the combined thickness of the portions of said force transmitting members received in said slots whereby said force transmitting members can also rock about an axis generally perpendicular to the last named axis.

References Cited by the Examiner

UNITED STATES PATENTS

| | | | |
|---|---|---|---|
| 2,866,524 | 12/58 | Flesch | 188—73 X |
| 2,883,007 | 4/59 | Klaue | 188—106 |
| 3,035,664 | 5/62 | Desvignes et al. | 188—73 |
| 3,065,829 | 11/62 | Bessler et al. | 188—73 |
| 3,081,843 | 3/63 | Dotto et al. | 188—152 X |

FOREIGN PATENTS 1,017,034  10/57  Germany.

ARTHUR L. LA PLANT, *Primary Examiner.*

EUGENE G. BOTZ, *Examiner.*